United States Patent [19]

Takayanagi

[11] Patent Number: 5,245,446
[45] Date of Patent: Sep. 14, 1993

[54] IMAGE PROCESSING SYSTEM
[75] Inventor: Hiroshi Takayanagi, Kanagawa, Japan
[73] Assignee: Fuji Xerox Co., Ltd., Tokyo, Japan
[21] Appl. No.: 594,943
[22] Filed: Oct. 10, 1990
[51] Int. Cl.⁵ .............................................. H04N 1/32
[52] U.S. Cl. ...................................... 358/468; 358/400
[58] Field of Search ................ 358/75, 405, 406, 407, 358/408, 411, 435, 436, 438, 468, 426, 474, 476, 400

[56] References Cited

U.S. PATENT DOCUMENTS 4,774,590 9/1988 Haganuma ........................ 358/401
4,853,767 8/1989 Sakai et al. ........................ 358/75

FOREIGN PATENT DOCUMENTS 0332103 9/1989 European Pat. Off. .

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

An image processing system includes data compressor for compressing image data, storing output data of the data compressor, data decompressor for decompressing the compressed data into the original image data and transferring the original image data to an image output section, and controlling the compressor data storage and decompressor whereby the image processing system compresses image data as fed from the image read device, stores the image data, reads the stored image data, decompresses the read out image data, and sends the decompressed image data to an image output section. The image processing system is improved in that at least one of output data bus line from the image read device or an output data bus line to the image output section has a bit-width larger than the number of bits constituting one pixel, and at least one pixel data is transferred every one clock cycle.

18 Claims, 4 Drawing Sheets

FIG. 2(a)
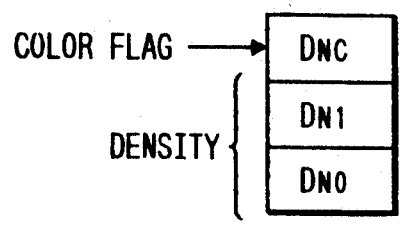
FIG. 3
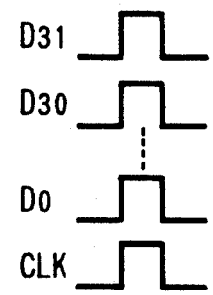
FIG. 2(b)
FIG. 2(c)
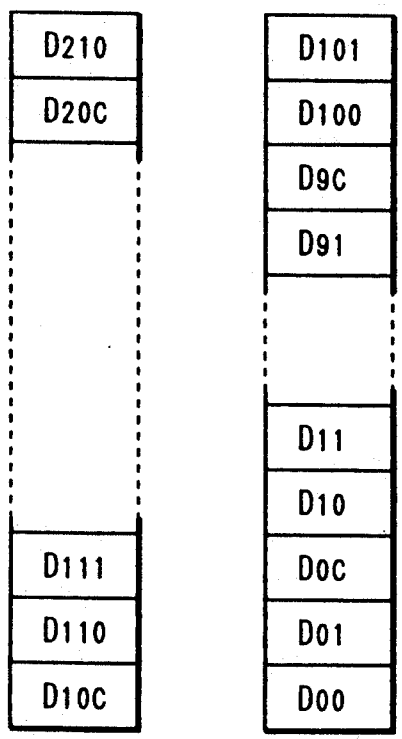

IMAGE PROCESSING SYSTEM

BACKGROUND OF THE INVENTION

1. Field of the Invention

The present invention relates to an image processing system with a data storage unit capable of the high speed transfer of image data, such as gradation data containing color information read by a scanner.

2. Discussion of the Related Art

FIG. 5 shows a block diagram of a conventional digital image processing system.

In a digital copying machine, an image input terminal 31 (hereafter "IIT") uses a CCD line sensor to read an image on a document, which may be fed by an auto document feeder 30 (hereafter "ADF") and converts an analog video signal into a digital signal. An image processing unit 32 (referred to as an IPS) then corrects, edits, and converts the digital signal. Finally, an image output terminal 33 (hereafter "IOT") turns pixels on and off according to the image data signal, thereby to form a mesh-dot image. Alternatively, in the case of gradation image data, the IOT 33 controls the turned on time. In this way, the image on the document is reproduced.

In such a digital image processing system, the image data read by the IIT 31 is transferred to the IPS 32. In the IPS 32, the image data is temporarily stored, appropriately processed, and output to the IOT 33. A plus 1 color copying machine, which produces a copy of a monochromatic image plus one color, may use a data structure in which one pixel is expressed by three bits, two bits for gradation and one bit for a color flag. In the copying machine, parallel data representing one pixel consisting of gradation bits $D_0$ and $D_1$, and a color flag $D_2$ are serially transferred every clock signal (see FIG. 6) by using a 3-bit wide bus line in combination with a clock line.

In such an arrangement, high speed image data transfer requires a corresponding increase in data transfer speed. For example, where A4 paper is laterally fed with a resolution of 400 dpi (dots per inch), an output of 40 ppm (pages per min.), and a paper movement speed of 220 mm/sec., the transfer clock frequency is required to be approximately 16 MHz.

As described above, conventional image processing systems transfer digital image data from the scanner to the image processing unit and transfer processed image data to the output terminal by simply transferring one pixel every clock signal by using a one-pixel data width bus. Therefore, the transfer clock frequency must proportionally be increased to read the image by the scanner and to print the image by the output terminal at high speed. This undesirably results in the need for expensive, high speed semiconductor devices, such as devices employing ECL technology, and further increases the generation of electric noise.

SUMMARY OF THE INVENTION

The present invention has been made in view of the above circumstances and has an object to provide an image processing system capable of transferring image data between the scanner and the image processing unit, and between the image processing unit and the image output terminal, without increasing the clock frequency.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided an image processing system including data compressing means for compressing image data, data storage means for storing output data of the data compressing means, data decompressing means for decompressing the compressed data into the original image data and transferring the original image data to an image output section, and control means for controlling each of the means, whereby the image processing system compresses image data as fed from the image read device, stores the image data, reads the stored image data, decompresses the read out image data, and sends the decompressed image data to an image output section, the image processing system being improved in that at least one of an input data bus line output from the image read device and an output data bus line output to the image output section has a number of bits greater in width than the number of bits constituting one pixel, and at least one pixel data is transferred every one clock.

In an embodiment of the present invention, the input data bus line from the image scanning device and an output data bus line to the image output section has a bit width that is larger than the number of bits constituting one pixel. The number of bits in the bus line is 16 bits, 32 bits, or 64 bits, for example. Data representing a plurality of pixels may be included within the data width of the bus line forming a single data package to transfer image data wherein a plurality of bits are used for each pixel. The data packages thus formed are serially transferred via the bus line. The attribute data represents various data attributes, such as the data structure, the number of data per scan line, and the number of scan lines, and is serially transferred through a control line. In the case where one pixel consists of 3 bits, and a 32 bit bus line is used, the 3rd bit of the 11th pixel cannot be contained in the present data package. In this case, the overflow or excess bit is put into the next data package. Accordingly, the 11th pixel data is transferred over two clock cycles. A receiving section generates line synchronization signals and page synchronization signals on the basis of the attribute data, and develops the received image data by using the line and page synchronization signals.

Thus, in the present invention, the individual parallel pixel data is transferred into parallel word data without distinguishing between gradation bits and color bits. The parallel word data are then serially transferred. The line sync is removed from the image data, and the data is transferred. Therefore, the data transfer between the image scanning device, the data storage unit, and the output section can readily be speeded up even though these various devices may be physically displaced from each other.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 2 FIGS. 2(a) through 2(c) are diagrams showing the data structures of the image data;

FIG. 3 is a diagram useful in explaining data transfer;

DETAILED DESCRIPTION OF THE PREFERRED EMBODIMENT

Figure 1:
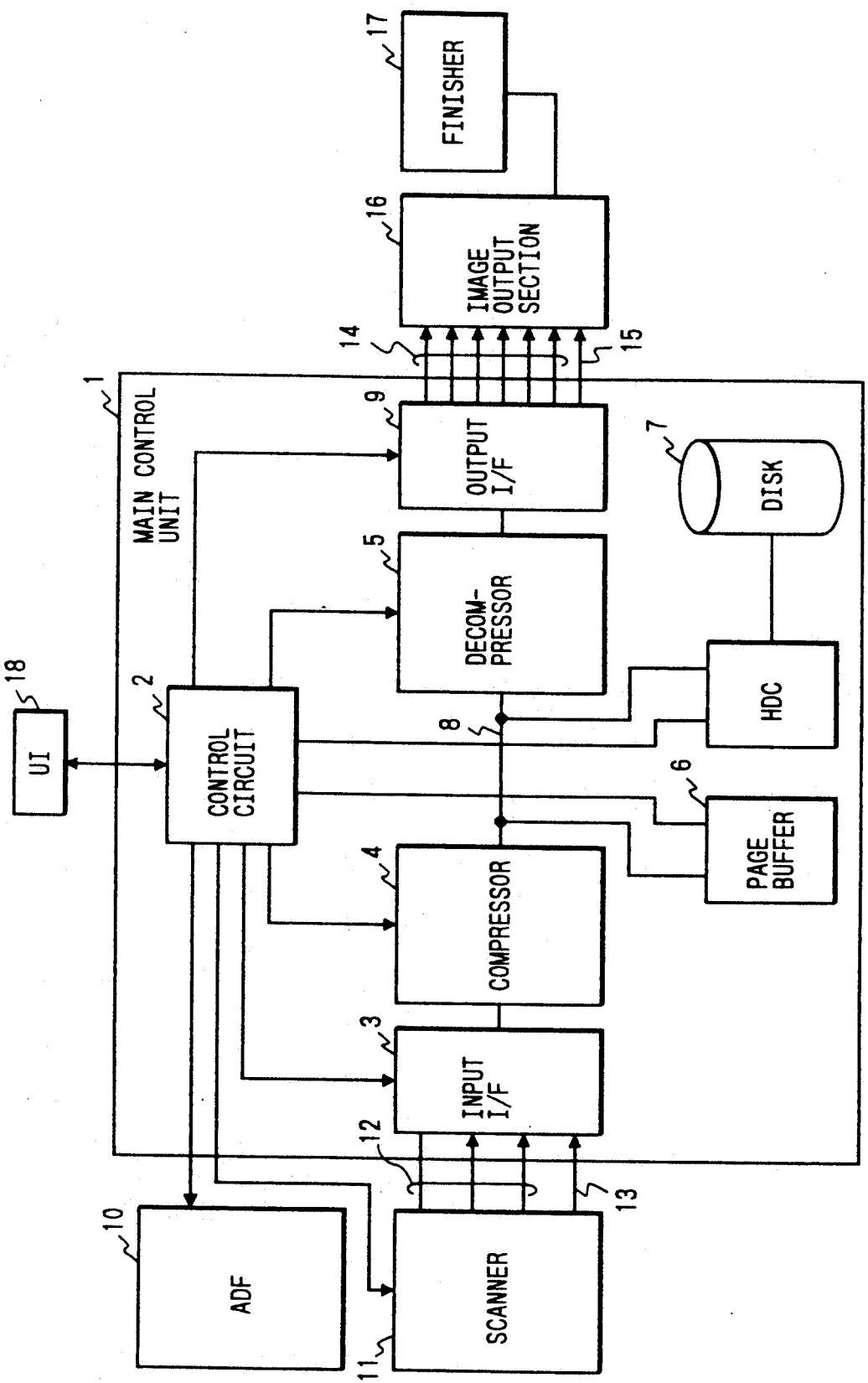
FIG. 1 is a block diagram showing an image processing system according to an embodiment of the present invention.

FIG. 1 is a block diagram showing an image processing system according to an embodiment of the present invention.

In the figure, a main control unit 1 is made up of an input interface (I/F) 3 for receiving image data from an image read device, a compressor 4 for compressing the received image data, a decompressor 5 for decompressing the compressed data, a page buffer 6, a disk 7 functioning as a memory for storing a great amount of data, an output interface (I/F) 9 for outputting the decompressed image data to an image output section 16 and a control circuit 2.

A scanner 11 functions as an image read device which reads an image on a document by a CCD sensor, for example. The scanner 11 executes the following operations: offset adjustment and gain adjustment of the read image signals, conversion of analog image data into digital image data, and gap correction, shading correction, and the like. For a color document, the scanner 11 reads a color document and produces image data representing three primary colors, R (red), G (green), and B (blue), and processes the image data using various techniques, such as END (equivalent neutral density conversion), color masking, document size detect, color change, UCR (under color removal), black generation, mesh-point removal, edge emphasis, TRC (tone reduction control), enlargement/reduction, editing, and the like. An ADF 10 is coupled to the scanner 11, and automatically feeds the document to be read.

An image output section 16 function as an IOT which controls a laser beam by turning it on or off for every pixel according to two-level data generated from the image data. Also, the image output section 16 reproduces a halftone image with mesh dots or the like. A finisher 17 binds the output prints.

An UI (user interface) 18 is constructed with a display, a control panel, and the like. A user may enter various functions and edits to the machine. The items as entered are displayed.

The major components of the main control unit 1 will now be described.

The input I/F 3, under control of the control circuit 2, rearranges the image data serially transferred through a bus line 12 into the original image data consisting of pixel data, on the basis of the attribute data transferred through control line 13.

The compressor 4 is for compressing the image data under an adaptive prediction coding system, for example. In this coding system, the image data are simultaneously predicted every 8 pixels by using a plurality of predictors. Of those predictors, the predictor whose prediction is most exact is used for the prediction of the next 8 pixels. In this case, "1" is assigned to a pixel signal indicative of correct prediction, while "0", to a pixel signal indicative of incorrect prediction.

The decompressor 5 decompresses the compressed image data into the original image data.

A page buffer 6 stores the image data of the documents of several pages. Before writing to or reading from the disk 7, the image data must be temporarily stored. The image data to be output is temporarily stored into the page buffer, not written into the disk 7, and is subjected to editing, such as data alteration and data replacement, under control of the control circuit 2. The image data is then output.

The disk 7 functions as a memory for storing a large amount of compressed image data. The transfer of the image data to and from the disk is under control of a disk controller HDC.

An output operation of an image as read by the scanner 11 will now be described.

In operation, the image data of a document read by the scanner 11 is output and applied to the input I/F 3 through a bus line 12. The image data from the input I/F 3 is compressed by the compressor 4. The compressed data is transferred to the page buffer 6 and then stored into the disk 7. The compressed image data is read from the disk 7 page by page and loaded into the page buffer 6, and transferred to the decompressor 5 where it is decompressed. The decompressed image data is transferred to the image output section 20, through the output I/F 9 and a bus line 14. In the case of a small number of pages, the image data may directly be transferred from the page buffer 6 or the compressor 4 to the decompressor 5, without being stored into the disk 7.

To make a plurality of copies of each document, the image data read by the scanner 11 is compressed by the compressor 4, and stored into the disk 7. Then, the image data is read out of the disk 7, in the proper page order, a number of times equal to the designated number of copies, and is applied to the decompressor 5. The decompressed image data is then transferred to the image output section 16. In this way, a plurality of images can be output with a single image reading by the scanner 11. The image data of the first copy may be stored into the disk 7, while at the same time be decompressed by the decompressor 7. If so done, the image output of the first copy is quickened, and the image output time is reduced.

The image data as read by the scanner and the data transfer through the bus line will now be described.

The scanner 11 and the input I/F 3 are connected by bus line 12, which has a bit width larger than the number of bits constituting one pixel, and the control line which transfers attribute data representative of the various attributes of the data, such as transfer data amount, by communication.

FIG. 2(a) shows the data structure of the n-th pixel as read by the scanner 11. As shown, the pixel data consists of a color flag $D_NC$, and gradation bits represented by $D_N1$ and $D_N0$. The image data of such parallel data structure are sequentially read by the scanner in the order of the 0th pixel data ($D_0C$, $D_01$, $D_00$), 1st pixel data ($D_1C$, $D_11$, $D_10$), and so on. In the scanner 11, by a bit-width converter to be described later, the pixel data of the image data each consisting of two gradation bits and one color bit are sequentially packed into a data package of 32 bits as shown in FIG. 2(C), for example. The first data package of 32 bits can contain pixel data up to and including the gradation bits $D_100$ and $D_101$ of the 11th pixel, but cannot contain the color bit $D_1 0C$ of the 11th pixel. The color bit $D_1 0C$ is included in the succeeding parallel data package.

In this way, the parallel pixel data is packed again into a parallel data package such as a word. The parallel data of 32 bits is then serially transferred through the 32-bit wide bus line 12 to the input I/F 3 every clock pulse signal. Accordingly, the 11th pixel data is transferred over two successive clocks cycles. Before the pixel data transfer, the attribute data is transferred by the control line 13 by serial communication. The attribute data is representative of attributes of the image data, such as the data structure of 2-bit gradation data and 1-bit color flag data number of data per scan line, and the number of scan lines. The image data to be transferred by using the 32-bit bus line is packed into the 32-bit data packages, without distinguishing between the gradation data and the color flag data. Those data packages are transferred serially. Accordingly, the line sync is not provided. For the data transferred, a line sync signal is generated based upon the number of data per scan line as transmitted by the serial communication line. Similarly page sync signal is generated based upon the number of line sync signals generated and the number of scan lines per page.

Figure 4:
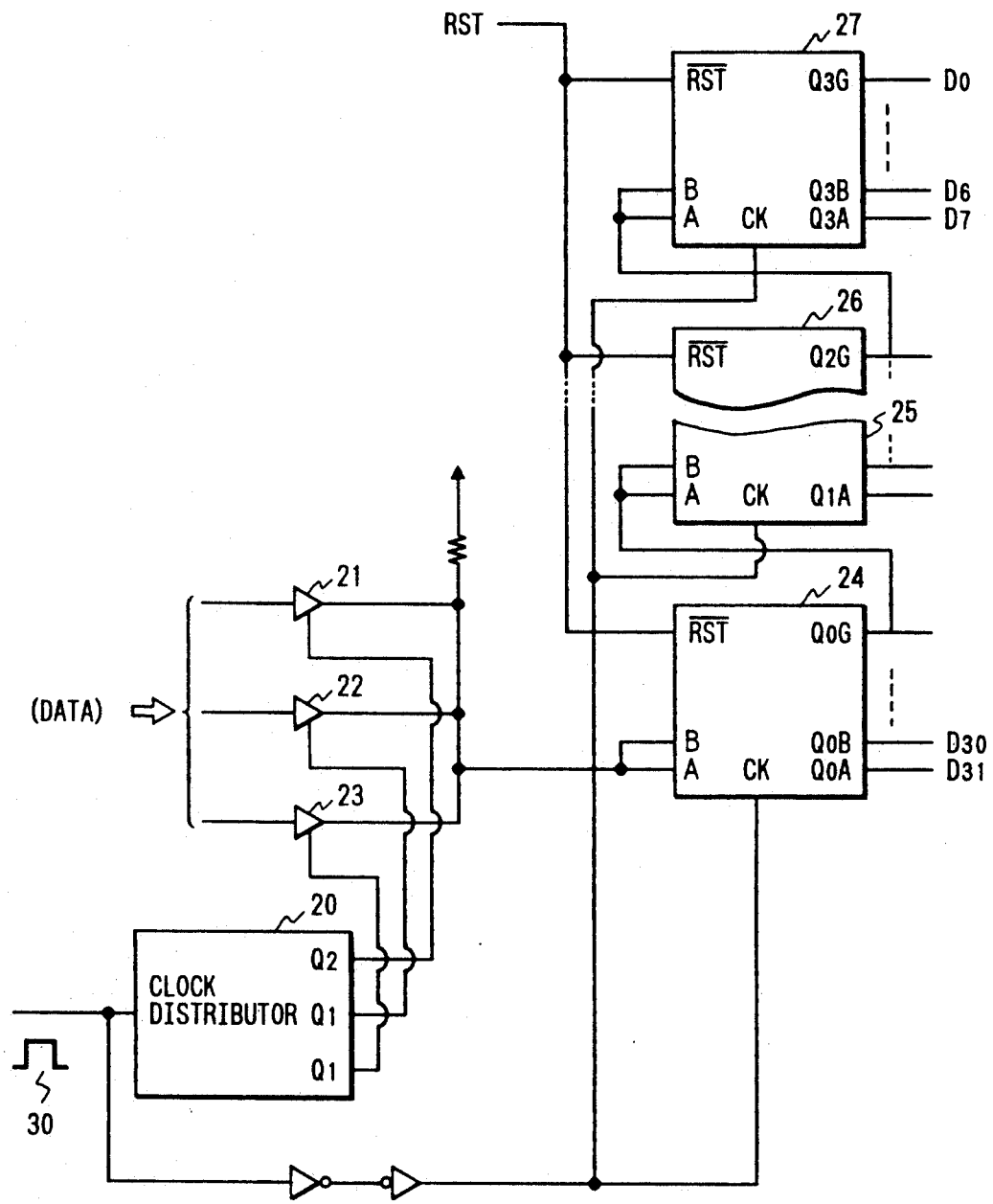
FIG. 4 is a block diagram showing a bit-width converter used in the image processing system of FIG. 1.
Figure 5:
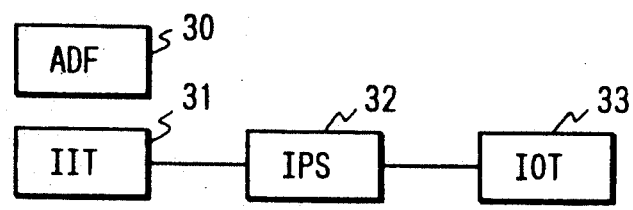
FIG. 5 shows a block diagram of a conventional digital image processing system.
Figure 6:
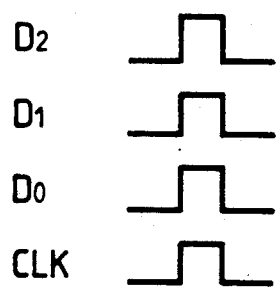
FIG. 6 is a diagram useful in explaining pixel serial transfer.

A bit-width converter which may be provided in the scanner 11 is shown in FIG. 4.

The bit-width converter comprises four shift registers 24, 25, 26, and 27 each for converting an 8-bit serial signal to a parallel signal, a 3-phase clock distributor 20, and three tri-state buffers 21, 22, and 23. In operation, the 3-bit pixel data is sequentially loaded into the shift register 24 through the tri-state buffers 21 to 23 under the control of the 3-phase clock distributor 20. The shift register 24 has output terminals $Q_0A$, $Q_0B$, ..., $Q_0G$. The output terminal $Q_0G$ is connected to the input terminal of the shift register 25. An output terminal $Q G$ of the shift register 25 is connected to an input terminal of the shift register 26. An output terminal $Q_2G$ of the shift register 26 is connected to an input terminal of the shift register 27. The data input through the tri-state buffers 21 to 23 is loaded into the shift registers 24 to 27 for conversion into 32-bit parallel data.

The input I/F 3 in the main control unit 1 converts the 32-bit data into 8-bit pixel data, and transfers the converted data to the compressor 4. In the main control unit 1, the 8-bit image data as decoded by the decompressor 5 is converted into 32-bit data packages by a bit-width converter similar to that of FIG. 4, which is provided in the output I/F 9. The 32-bit data packages are serially transferred to the image output section 16 by way of the bus line 14. Also in this case, the attribute data, which represents the various attributes of the data, such as the data structure of the image data, the number of data per scan line, and the number of scan lines per page, is transferred via a control line 15 by the serial communication.

In the image output section 16, an image of mesh-dots is formed by using pixel data, each pixel consisting of the 2-bit gradation data and the 1-bit color flag. The image data is then printed out, and the printed sheets are bound by a finisher 17.

In the above described embodiment, the pixel data of the image data is converted into 32-bit data packages, and those data packages are serially transferred. Of course, the number of bits of the data package in alternative embodiments may be any other number of bits such as, for example, 16 bits or 64 bits.

As seen from the foregoing description, the parallel pixel data consisting of the gradation bits and the color bit is reconverted into word parallel data in preparation for printing the image data. The word parallel data is serially transferred to the image output section 16. The parallel pixel data may be handled without special treatment of the color bit, or without distinguishing between the gradation data or the color flag. The transfer data amount is transferred by another line, or a communication line. Therefore, the remote data transfer among the image read device, storage unit, and the image output section, of which the speed-up is difficult, can readily be done at high speed. For the case where A4 paper is laterally fed, the resolution is 400 dpi (dot per inch) and the output rate is 40 ppm (prints per min.), and the process speed is 220 mm/sec., the transfer clock frequency must only be approximately 1.5 MHz, while it is approximately 16 MHz in the conventional system.

The foregoing description of preferred embodiment of a the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. An image processing system for processing original image data comprising:

image reading means for reading an original image and for outputting original image data, said image reading means including an output bus with a bit width larger than the number of bits constituting one pixel, said output bus transferring a plurality of bits corresponding to at least one pixel during each clock cycle, a control line for transferring attributes of the data, and wherein line synchronization data and page synchronization data are not contained in the data transferred over the output bus;

data compressing means for compressing image data;

data storage means for storing output data of said data compressing means;

data decompressing means for decompressing the compressed data into decompressed data corresponding to the original image data and for transferring said decompressed data to an image output section;

image output means coupled to the image output section for outputting an image corresponding to the original image data; and control means for controlling said image read means, data compressing means, data storage means, and data decompressing means.

2. The image processing system according to claim 1, wherein said pixel includes color information.

3. The image processing system according to claim 1, wherein the number of bits transferred during one clock cycle over said output bus is 16 bits.

4. The image processing system according to claim 1, wherein the number of bits transferred during one clock cycle over said output bus is 32 bits.

5. The image processing system according to claim 1, wherein the number of bits transferred during one clock cycle over said output bus is 64 bits.

6. The image processing system according to claim 1, wherein said original image data is converted into data packages each having a data width equal to the data width of said output bus, and wherein said data packages are serially transferred by said output bus.

7. The image processing system of claim 6 wherein the serially transferred data packages are transmitted to the image output section over a serial communication line.

8. The image processing system according to claim 1, wherein said original image data is converted into data packages each having a data width equal to the data width of said output bus, and wherein said data packages are serially transferred by said output bus.

9. The image processing system of claim 8 wherein the serially transferred data packages are transmitted to the image output section over a serial communication line.

10. An image processing system for processing original image data comprising:
   image reading means for reading an original image and for outputting during each clock cycle a plurality of bits greater than a number of bits constituting one pixel;
   data compressing means for compressing image data;
   data storage means for storing output data of said data compressing means;
   data decompressing means for decompressing the compressed data into decompressed data corresponding to the original image data and for transferring said decompressed data to an output bus with a bit width larger than the number of bits constituting one pixel, said output bus transferring at least one pixel during each clock cycle;
   a control line for transferring attributes of the data, and wherein line synchronization data and page synchronization data are not contained in the data transferred over the output bus;
   image output means for outputting an image corresponding to the original image data; and
   control means for controlling said image read means, data compressing means, data storage means, and data decompressing means.

11. The image processing system according to claim 10, wherein said pixel includes color information.

12. The image processing system according to claim 10, wherein the number of bits transferred during one clock cycle over said output bus is 16 bits.

13. The image processing system according to claim 10, wherein the number of bits transferred during one clock cycle over said output bus is 32 bits.

14. The image processing system according to claim 10, wherein the number of bits transferred during one clock cycle over said output bus is 64 bits.

15. The image processing system according to claim 10, wherein said original image data is converted into data packages each having a data width equal to the data width of said output bus, and wherein said data packages are serially transferred by said output bus.

16. The image processing system according to claim 10, wherein said original image data is converted into data packages each having a data width equal to the data width of said output bus, and wherein said data packages are serially transferred by said output bus.

17. The image processing system of claim 16 wherein the serially transferred data packages are transmitted to the image output section over a serial communication line.

18. An image processing system for processing original image data comprising:
   image reading means for reading an original image and for outputting original image data, said image reading means including a bit width converter for sequentially packing pixel data into a parallel word;
   a first output bus coupled to said converter for serially outputting during each clock cycle a plurality of bits corresponding to at least one pixel, said first output bus having a bit width larger than the number of bits constituting one pixel;
   data compressing means for compressing image data;
   data storage means for storing output data of said data compressing means;
   data decompressing means for decompressing the compressed data into decompressed data corresponding to the original image data and for transferring said decompressed data to an image output section via a second output bus with a bit width larger than the number of bits constituting a pixel, said output bus transferring at least one pixel during each clock cycle;
   image output means coupled to said output bus for outputting an image corresponding to the original image data; and
   control means for controlling said image read means, data compressing means, data storage means, and data decompressing means.

* * * * *